US008327169B2

(12) United States Patent
Bozek et al.

(10) Patent No.: US 8,327,169 B2
(45) Date of Patent: Dec. 4, 2012

(54) POWER MANAGEMENT TO MAXIMIZE REDUCED POWER STATE FOR VIRTUAL MACHINE PLATFORMS

(75) Inventors: James J Bozek, Bothell, WA (US); Edward Stanley Suffern, Chapel Hill, NC (US); James Lee Wooldridge, Fall City, WA (US)

(73) Assignee: International Business Machines Corporation, Armonk, NY (US)

( * ) Notice: Subject to any disclaimer, the term of this patent is extended or adjusted under 35 U.S.C. 154(b) by 757 days.

(21) Appl. No.: 12/393,475

(22) Filed: Feb. 26, 2009

(65) Prior Publication Data

US 2010/0218014 A1    Aug. 26, 2010

(51) Int. Cl.
    G06F 1/32    (2006.01)
(52) U.S. Cl. .................................. 713/320; 713/300
(58) Field of Classification Search .................. 713/320, 713/300
    See application file for complete search history.

(56) References Cited

U.S. PATENT DOCUMENTS

| 5,109,510 | A * | 4/1992 | Baker et al. ................... 718/104 |
| 5,452,294 | A * | 9/1995 | Natarajan ...................... 370/351 |
| 6,715,088 | B1 * | 3/2004 | Togawa ......................... 713/320 |
| 7,398,401 | B2 | 7/2008 | Goud et al. |
| 7,543,166 | B2 * | 6/2009 | Zimmer et al. ................ 713/310 |
| 7,734,778 | B2 * | 6/2010 | Tsao ............................... 709/225 |
| 2002/0083110 | A1 * | 6/2002 | Kozuch et al. .................... 709/1 |
| 2004/0111596 | A1 | 6/2004 | Rawson, III |
| 2005/0268078 | A1 | 12/2005 | Zimmer et al. |
| 2008/0177424 | A1 | 7/2008 | Wheeler |
| 2009/0106571 | A1 * | 4/2009 | Low et al. ...................... 713/310 |
| 2009/0204826 | A1 * | 8/2009 | Cox et al. ....................... 713/320 |
| 2009/0217072 | A1 | 8/2009 | Gebhart et al. |
| 2010/0138528 | A1 * | 6/2010 | Frank ............................. 709/224 |
| 2010/0138828 | A1 * | 6/2010 | Hanquez et al. ................... 718/1 |

FOREIGN PATENT DOCUMENTS

| JP | 2004/086344 A | 3/2004 |
| JP | 2006/172283 A | 6/2006 |

OTHER PUBLICATIONS

*Virtual Linux servers under z/VM: security, performance, and administrative issues*, D. Turk, published in the *IBM Systems Journal*, Jul. 2005.
*More POWER to Ya, Expanded Virtualization Manager capabilities help customers grow and manage virtualized environments*, Jim Fall, published in the IBM Systems Magazine, Sep. 2007.
*Data compression technology in ASIC cores*, Burroughs et al., published in the *IBM Journal of Research and Development*, vol. 42, No. 6, 1998.
PCT Search Report dated Jan. 6, 2010.

* cited by examiner

*Primary Examiner* — Nitin Patel
(74) *Attorney, Agent, or Firm* — Julius B. Kraft; Thomas E. Tyson

(57) ABSTRACT

Power management in a virtual machine environment that includes at least one virtual machine platform providing a plurality of virtual machines, and a plurality of separate (user) computers, each connected to a respective one of the virtual machines in a typical virtual machine distribution environment. There is also provided a function, independent of the connections of the user computers to the virtual machines, for determining if each of said computers connected to the virtual machines is in an active state together with a function for switching the virtual machine platform into a reduced power consumption state in the platform when all of the computers connected to virtual machines are in a non-active state.

15 Claims, 4 Drawing Sheets

POWER MANAGEMENT TO MAXIMIZE REDUCED POWER STATE FOR VIRTUAL MACHINE PLATFORMS

TECHNICAL FIELD

The present invention relates to virtual machine platforms including a plurality of virtual machines, each respectively connected to each of a plurality of separate computers and particularly to power management for such virtual machine platforms.

BACKGROUND OF RELATED ART

In the past ten years, with the great increase in World Wide Web (Web) systems, the computer processing power required by an organization has grown exponentially each year so that now hundreds and even thousands of servers are required. This has led to a resurgence of larger and larger mainframe computers. Particularly mainframe and like large computers operating in a virtual machine (VM) mode in which multiple instances of an operating system and associated application program reside in the same physical hardware. Such virtual machines have been satisfying the needs for the large number of servers that are often arrayed as virtual machine server farms. For further background, attention is directed to the article: *Virtual Linux servers under z/VM: security, performance, and administrative issues*, D. Turk, published in the *IBM Systems Journal*, July 2005; and to the article: *More POWER to Ya, Expanded Virtualization Manager capabilities help customers grow and manage virtualized environments*, Jim Fall, published in the IBM Systems Magazine, September 2007.

In such virtual machine environments wherein multiple user computers are connected to each virtual machine platform providing a plurality of virtual machines respectively connected to these multiple users, power management is difficult to control. Full power is required at each virtual machine platform prior to the initiation of a virtual machine session. Since the virtual machine platform must always be available to remote user computers that need to access appropriate virtual machines, it has been customary to continuously operate any online platform in a full power mode. The wasted power consumption becomes particularly pronounced when the virtual machine platforms are arrayed as virtual machine server farms.

SUMMARY OF THE PRESENT INVENTION

The present invention addresses the power consumption problem of maintaining each virtual machine platform in a full power mode even when there are no user computers connected to the virtual machine platform in an active mode.

To this end, the present invention provides a system, method and computer program for power management in a virtual machine environment that includes at least one physical virtual machine platform providing a plurality of virtual machines, and a plurality of separate (user) client devices each connected to a respective one of the virtual machines in a typical virtual machine distribution environment. Client devices are understood to include user computers and computer subsystems, including printers, disk drives and serial ports, among others. In the description of the following invention, when the term user computer is used, it is intended to include all such client devices.

There is also provided a function, independent of the connections of the user computers or client devices to the virtual machines, for determining if each of said client devices connected to the virtual machines is in an active state together with a function for switching the virtual machine platform into a reduced power consumption state in the platform when all of the user computers connected to the virtual machines are in a non-active state.

In preferred operations, the implementation of this invention is when the plurality of user computers are remote from the virtual machine platform, and there are networks, usually the Internet or Web (these two terms are used interchangeably in this description) for respectively connecting the plurality of user computers to the virtual machine platform.

As set forth above, the present invention is particularly advantageous in systems, e.g. virtual server farms, wherein there are a plurality of the virtual machine platforms, each platform respectively providing a plurality of virtual machines, together with a plurality of user sets, each user set including a plurality of user computers or devices respectively connected to the virtual machines in one of the plurality of virtual machine platforms, so that the means for switching switch a respective one of the virtual machine platforms into a reduced power consumption state when all of the user computers or client devices connected to virtual machines in the respective one platform are in a non-active state. Such an implementation may be effectively used when the plurality of the virtual machine platforms provide servers arranged as a virtual server farm, and each of the plurality of sets of user computers are client devices or user computers connected to the virtual machines in the respective servers.

As will be hereinafter set forth in greater detail, in a preferred embodiment of this invention, the implementation for switching the virtual machine platform into the reduced power state is in the virtual machine platform and the means for communicating whether each of said computers are in a non-active state are connected to the means for switching by a path independent of an operating system of said virtual machine platform. This path for communicating the non-active state is connected to the Basic Input Output System (BIOS) firmware of the virtual machine platform by a route independent of said hypervisor of the platform. In such an arrangement, the virtual machine platform includes a baseboard management controller (BMC) having a function for tracking the non-active states of the connected user computers and the path for communicating the non-active state is connected to the BIOS through the BMC.

BRIEF DESCRIPTION OF THE DRAWINGS

The present invention will be better understood and its numerous objects and advantages will become more apparent to those skilled in the art by reference to the following drawings, in conjunction with the accompanying specification, in which.

DETAILED DESCRIPTION OF THE PREFERRED EMBODIMENT

Figure 1:
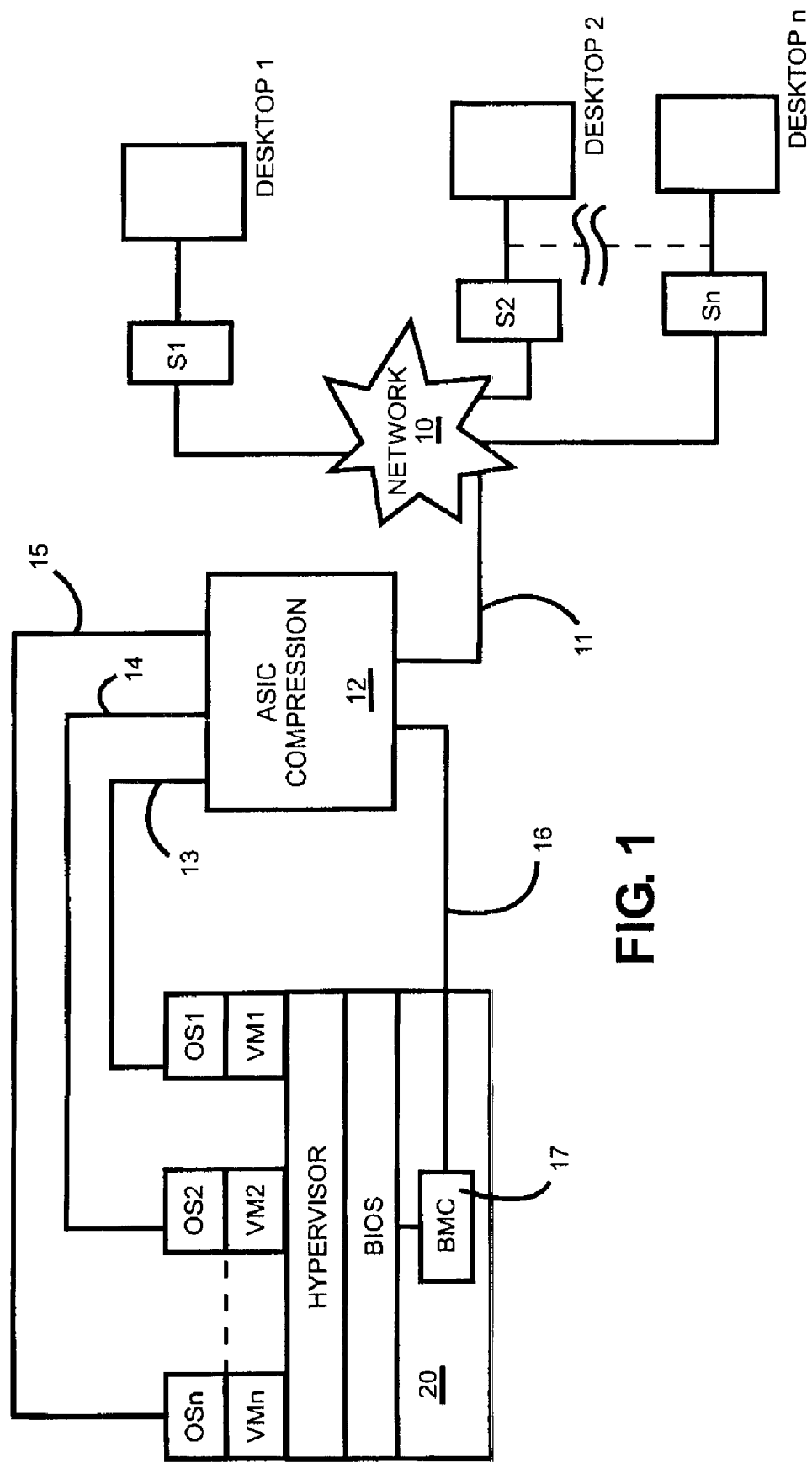
FIG. 1 is a generalized diagrammatic view of a network portion, including a single representative virtual machine platform and a set of remote user computers or client devices connected to virtual machines in the platform to illustrate the non-active state monitoring of the user computers.

Referring to FIG. 1, there is shown a generalized diagrammatic view of a network portion, including a single representative virtual machine platform 20, and a set of remote user computers, i.e. client devices, Desktops 1, 2 and n connected via network 10, e.g. the Web, and respective servers S1, S2 and Sn, to virtual machines, VM1, VM2 and VMn in the platform, using operating systems OS1, OS2 and OSn.

The assignment of specific virtual machines, VMs to specific user computers, desktops 1 through n, is allocated by hypervisor 21, the virtual machine platform supervisor. The hypervisor manages the multiple operating systems, OS1-OSn, as well as the platform's processor, BIOS 22, memory and other resources as required. Since this is a virtual machine platform, the hypervisor may be considered to be a virtualization manager. Current conventional VM connection brokers (not shown) operate to assign the currently running virtual machines on platform 20 to specific client devices illustrated by user desktops 1 to n. However, such connection brokers are only involved in the login and disconnect processes. Thus, if a particular desktop 1, 2 or n logs in and then is idle, the particular assigned VM and its associated resources in the virtual machine platform 20 remain fully powered irrespective of the non-activity of assigned user desktop 1 through n computers.

Accordingly, the present invention provides an implementation independent from the operating systems and the hypervisor 21 of the platform 20 to detect non-activity of the allocated user desktop 1-n computers. Thus, in the environment of FIG. 1, the hypervisor, which may be commercially available in a VMware, Citrix or Calista environment, has an individual software component working with hardware compression engines that allow the multiple users (desktops 1-n) to access the same platform 20. Thus, when the platform hardware is powered on, the hypervisor allocates memory resources specific for that user. When the user no longer requires the resources, e.g. logs off, the resources are released back into the platform pool. However, the platform 20 remains fully powered on and fully functional, even though the platform is no longer required.

The present invention, as will be hereinafter described in greater detail, provides for putting the platform into a lower power consumption state when virtual machine resources (processor, memory, operating system and application software) are no longer required by the user computers o client devices, i.e. all are in the non-active state; but when a user computer or client device does require the use of a VM supported by the platform, i.e. the user computer becomes active, the platform 20 exits the low power state and becomes fully operational.

The implementation of the present invention takes advantage of existing apparatus for changing power states of a virtual machine platform 20. The BIOS 22 provides industry standard Advanced Configuration and Power Interface (ACPI) states that are able to remove power from different parts of the platform 20.

In the implementation of the invention, there is a path through network 10 (may be the Internet or Web) via connection 11 through ASIC (Application-Specific Integrated Circuit) compression core 12 wherein the user desktop 1-n computers may be respectively connected to their allocated VM 1-n and operating system OS1-n. This is controlled by hypervisor 21. The ASIC compression core enables data from the user computers, desktops 1-n, to be suitably compressed so as to be most efficiently stored in association with the virtual machine platform for usage by the virtual machines to which the data is illustrated to be applied via connections 13, 14 and 15. Standard ASIC cores are described in the publication: *Data compression technology in ASIC cores*, S. H. Burroughs et al., in the *IBM Journal of Research and Development*, Volume 42, Number 6, 1998.

The tailoring of the ASIC core has sufficient flexibility so that a connection 16 may be formed from ASIC Compression Core 12 through the Baseboard Management Controller (BMC) 17 in the platform 20 directly into BIOS 22. BMC is a conventional specialized mini-controller embedded in a conventional server computer baseboard that functions as the intelligence using the conventional Intelligent Platform Management Interface (IPMI). The BMC, thus, functions to manage the interface between the system management software and the platform hardware.

As will be hereinafter described in greater detail with respect to the program of this invention, which may be stored in the hypervisor 21, the BMC 17 tracks the number of users in the environment of the virtual machine platform 20. When a session between a client device (user desktop) and its allocated VM is tracked to have been non-active for a predetermined period, the BMC removes the user computer from the activity pool. Each entry and exit from the non-activity state is logged for each client device or user computer. In an embodiment to be described with respect to FIG. 4, use is made of an embedded activity timer proved in standard ASIC cores. The BMC sets a timer when activity for a particular user computer stops. Then, upon time expiration the non-active user computer is removed from an activity tracking table located in the BMC through input to the BIOS 22. With this implementation, the tracking and communication of the active and non-active states of the user computers or client devices is carried out independent of the operating systems and hypervisor of the virtual machine platform, allowing independent control of the low power states for the virtual machine platform.

Figure 2:
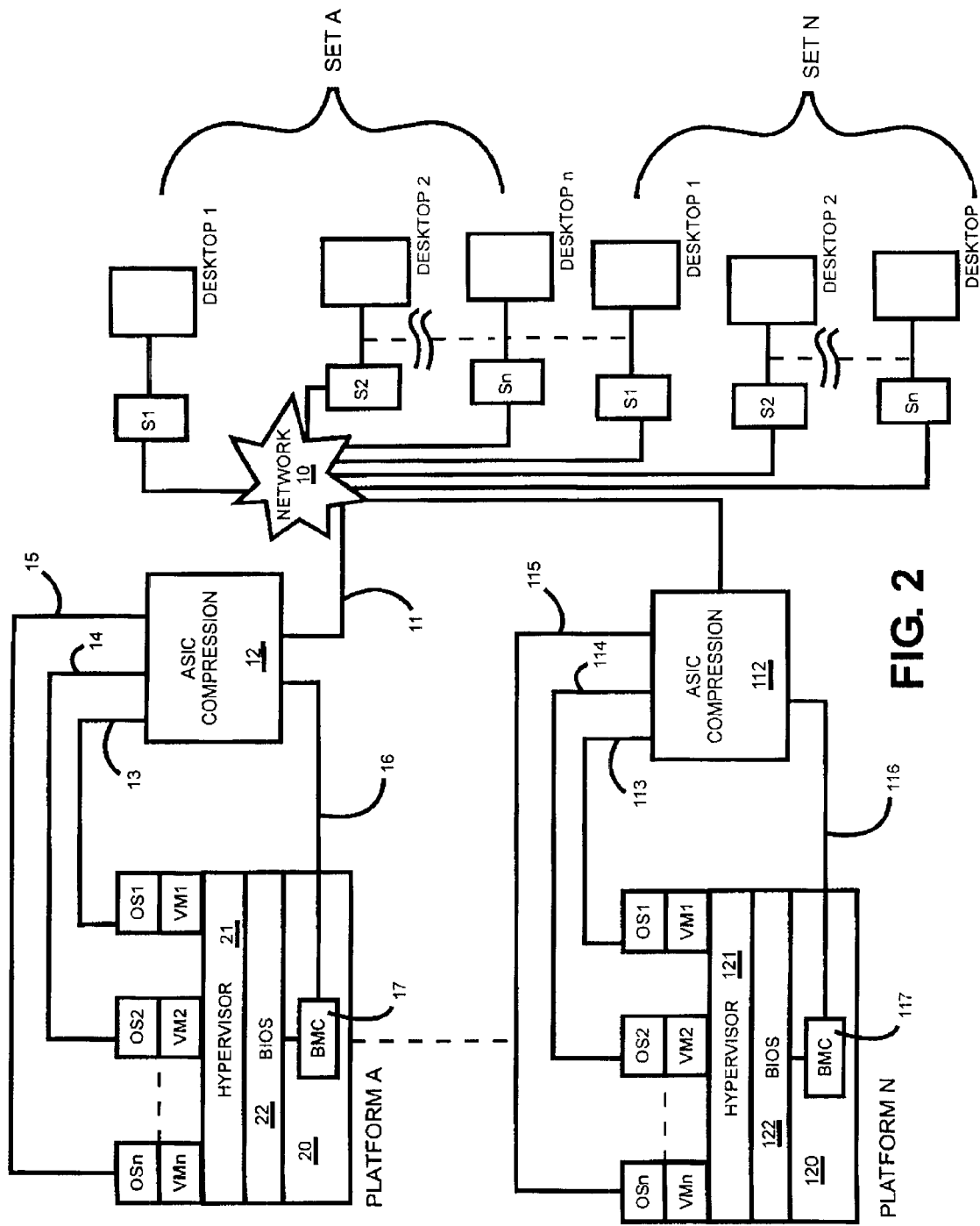
FIG. 2 is a diagrammatic view like that of FIG. 1 showing a plurality of virtual machine platforms respectively connected to a plurality of sets of user computers.

Now, with reference to FIG. 2, there will be shown the implementation for power management as applied in a system that has multiple virtual machine platforms (A-N) respectively connected to a plurality of sets of user computers (client devices). Such an arrangement is utilized in virtual machine environments used for virtual server farms. In such an arrangement, each Platform A-N may each function independently in the manner described for the virtual machine platform of FIG. 1. For convenience in illustration, elements 111 through 117 and 120 through 122 in Platform N correspond to and function in the same manner as described above for elements 11 through 17 and 20 through 22 in Platform A.

Figure 3:
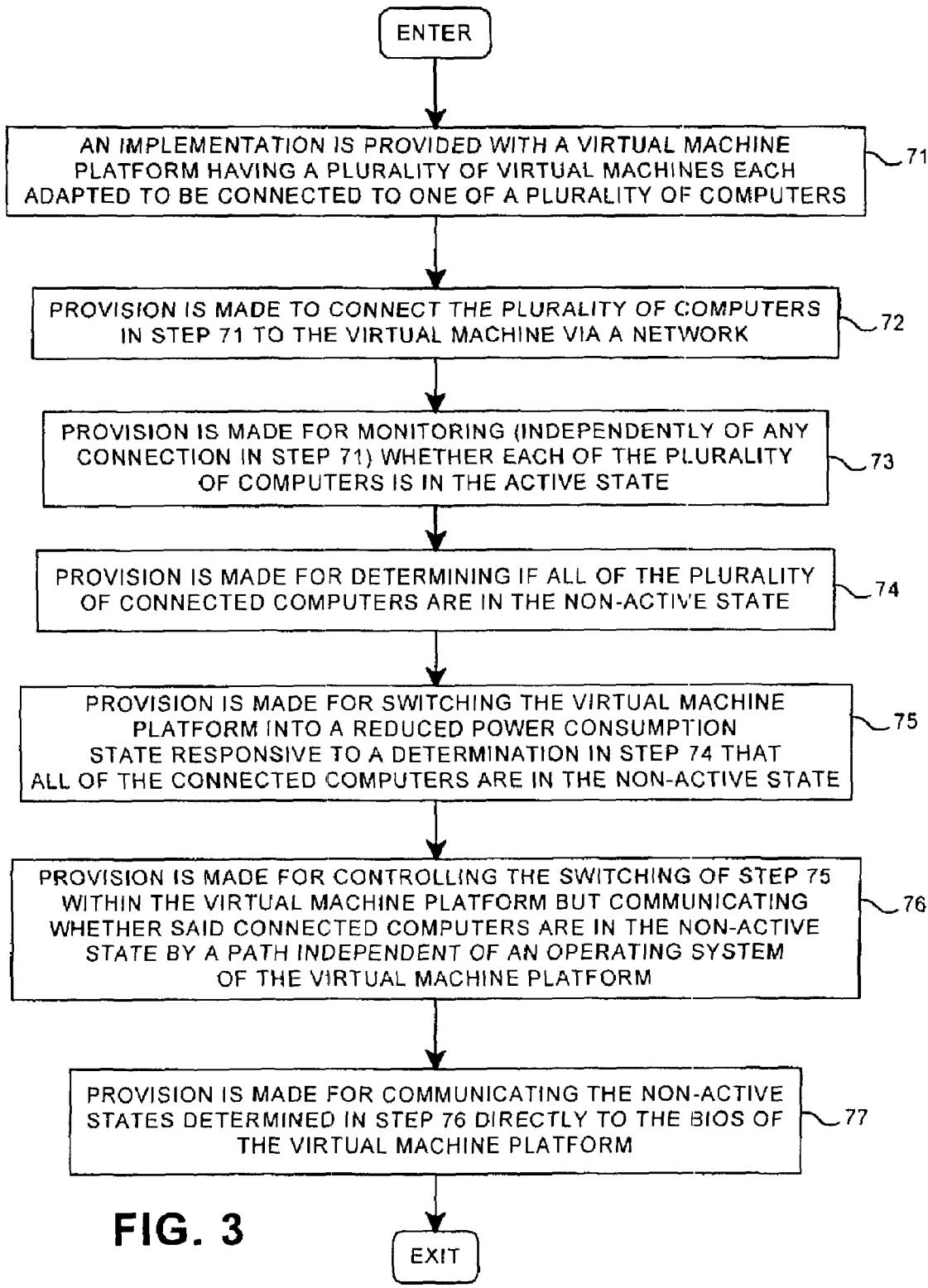
FIG. 3 is a general flowchart of a program set up to implement the present invention for power management in a virtual machine environment.

FIG. 3 is a flowchart showing the development of a process according to the present invention for power management in a virtual machine environment. In a multi-virtual machine platform environment, an implementation is provided wherein each virtual machine platform has a plurality of virtual machines, each of which is adapted to be connected to one of a plurality of user computers (client devices), step 71. Provision is made to connect the user computers of step 71 to a virtual machine via a network, step 72. Provision is made for monitoring (independently of any connection in step 71) whether each of the plurality of computers is in the active state, step 73. Provision is made for determining if all of the plurality of connected computers are in the non-active state, step 74. Provision is made for the switching of the virtual machine platform into a reduced power consumption state responsive to a determination in step 74 that all of the connected computers are in the non-active state, step 75. Provision is made for controlling the switching of step 75 within the virtual machine platform wherein communication as to whether the connected computers are in a non-active state is by a path independent of the operating system of the virtual machine platform, step 76. Provision is made for communicating the non-active states determined in step 76 directly to the BIOS of the virtual machine platform, step 77.

Figure 4:
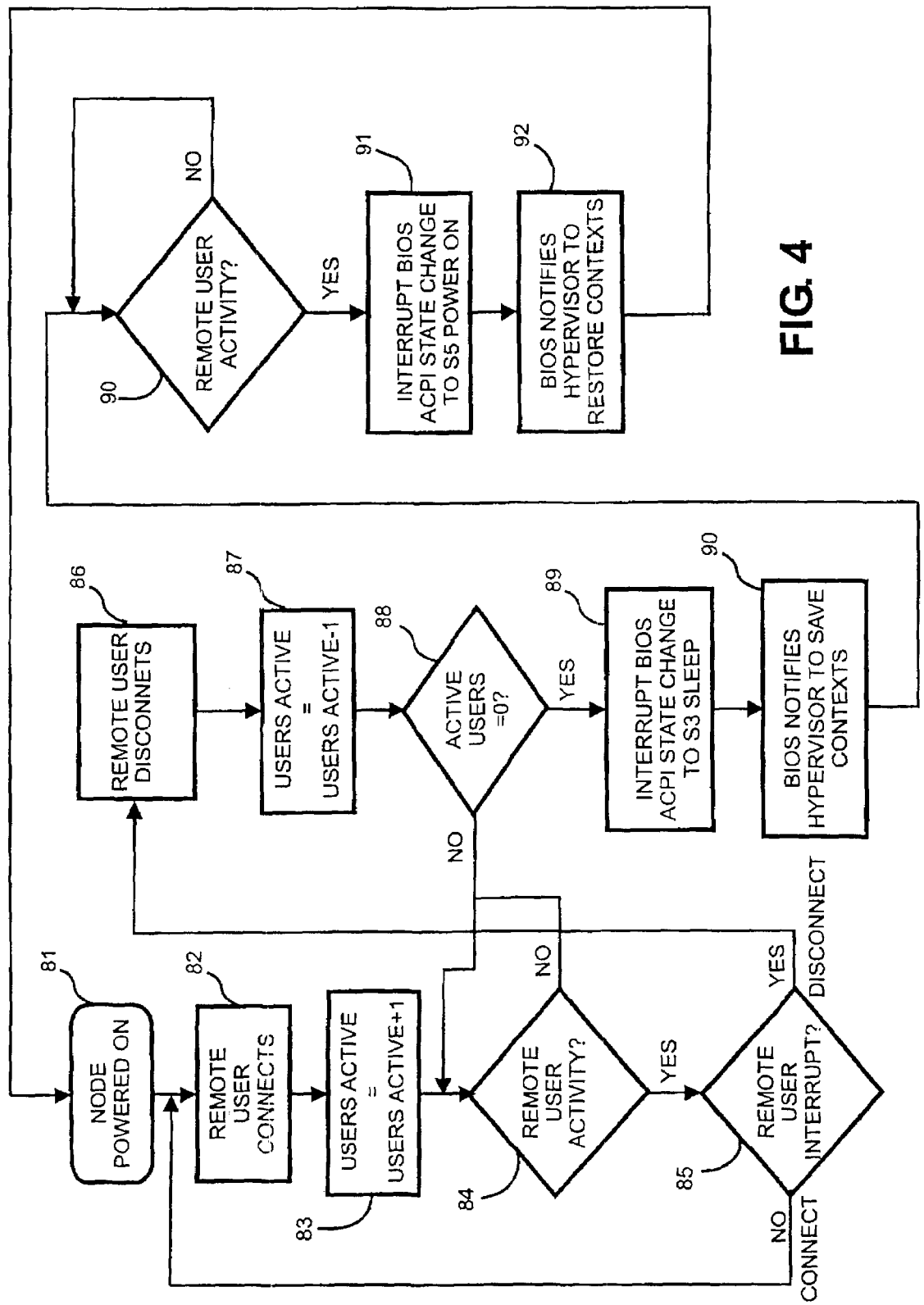
FIG. 4 is a flowchart of an illustrative run of the program set up in FIG. 3.

The running of the process set up in FIG. 3 is described with respect to the flowchart of FIG. 4. Initially, step 81, the system has been powered on. Accordingly, there are remote user computers (client devices) connected, step 82. A counter is set (step 83):

Users Active=Remote users+1

A determination is then made, step 84, as to whether there has been a change in remote user computer activity, step 84. If Yes, then, step 85, a determination is made as to whether there has been an interrupt (or change) in the activity of a remote user, step 85. In this step, a user can connect, disconnect or become inactive (if the user's activity timer has expired). If Yes, there has been a user activity interrupt, the remote user has disconnected from the active state, step 86. Then the counter is changed (step 87):

Users active=users active−1

A determination is then made (step 88):

Active users=0, step 88

If No, the flow is branched back to step 84 and the process continued. If Yes, step 89, there is a BIOS/ACIP interrupt in the virtual machine platform to allow the system into a low power "S3 Sleep" state. The BIOS then advises the hypervisor for the platform to save the contexts, step 90. In this low power consumption sleep state, the activity of the remote user computers continues to be monitored, step 90, for a change back to a remote user activity state. If Yes, then step 91, there is a BIOS/ACIP change in the virtual machine platform into a high activity power-on "S5" full power state. The BIOS then advises the hypervisor for the platform to restore the contexts, step 92.

Although certain preferred embodiments have been shown and described, it will be understood that many changes and modifications may be made therein without departing from the scope and intent of the appended claims.

What is claimed is:

1. A method for power management in a virtual machine platform including a plurality of virtual machines, each respectively connected, through a platform hypervisor, to each of a plurality of separate client devices comprising:
   determining, independently of said connections through said platform hypervisor of said client devices to said virtual machines if each of said client devices connected to said virtual machines is in an active state;
   switching said virtual machine platform into a reduced power consumption state when all of said client devices connected to virtual machines are in a non-active state; and
   communicating whether each of said client devices are in a non-active state to said virtual machine platform by a path, independent of an operating system of said virtual machine platform, connected to the BIOS of the virtual machine platform independent of the hypervisor of the virtual machine platform.

2. The method of claim 1, wherein:
   said plurality of client devices are remote from said virtual machine platform; and
   respectively connecting said plurality of client devices to said virtual machine platform through a network.

3. The method of claim 2, wherein said network is the World Wide Web.

4. The method of claim 2 wherein said power management is for a plurality of said virtual machine platforms, each platform respectively providing a plurality of virtual machines and includes:
   connecting a plurality of sets, each set including a plurality of client devices, respectively to the virtual machines in one of said plurality of virtual machine platforms;
   wherein a respective one of said virtual machine platforms is switched into a reduced power consumption state when all of said client devices connected to virtual machines in said respective one platform are in a non-active state.

5. The method of claim 2, wherein
   said switching of said virtual machine platform into said reduced power state is controlled in said virtual machine platform.

6. A computer usable non-transitory storage medium having stored thereon a computer readable program for power management in a virtual machine platform including a plurality of virtual machines, each respectively connected through a platform hypervisor to each of a plurality of separate client devices, wherein the computer readable application program when executed on a computer causes the executing computer to:
   determine, independently of said connections through said platform hypervisor of said client devices to said virtual machines, if each of said client devices connected to said virtual machines is in an active state;
   switch said virtual machine platform into a reduced power consumption state when all of said client devices connected to virtual machines are in a non-active state; and
   communicate whether each of said client devices are in a non-active state to said virtual machine platform by a path, independent of an operating system of said virtual machine platform, to the BIOS of the virtual machine platform independent of the hypervisor of the virtual machine platform.

7. The computer usable medium of claim 6, wherein
   said plurality of client devices are remote from said virtual machine platform; and
   said plurality of client devices are respectively connected to said virtual machine platform through a network.

8. The computer usable medium of claim 7, wherein said network is the World Wide Web.

9. The computer usable medium of claim 7 wherein said power management is for a plurality of said virtual machine platforms, each platform respectively providing a plurality of virtual machines and said computer program when executed
   connects a plurality of sets, each set including a plurality of client devices, respectively to the virtual machines in one of said plurality of virtual machine platforms; and
   switches a respective one of said virtual machine platforms into a reduced power consumption state when all of said client devices connected to virtual machines in said respective one platform are in a non-active state.

10. The computer usable medium of claim 7, wherein said computer program when executed causes the executing computer to:
    control the switching of said virtual machine platform into said reduced power state within said virtual machine platform.

11. A system for power management in a virtual machine platform including a plurality of virtual machines, each respectively connected, through a platform hypervisor, to each of a plurality of separate client devices, the system comprising:
- a processor;
- a computer memory holding computer program instructions which when executed by the processor perform the method comprising:
- determining, independently of said connections through said platform hypervisor of said client devices to said virtual machines if each of said client devices connected to said virtual machines is in an active state;
- switching said virtual machine platform into a reduced power consumption state when all of said client devices connected to virtual machines are in a non-active state; and
- communicating whether each of said client devices are in a non-active state to said virtual machine platform by a path, independent of an operating system of in said virtual machine platform, connected to the BIOS of the virtual machine platform independent of the hypervisor of the virtual machine platform.

12. The system of claim 11, wherein:
said plurality of client devices are remote from said virtual machine platform; and
the performed method when executed respectively connects said plurality of client devices to said virtual machine platform through a network.

13. The system of claim 12, wherein said network is the World Wide Web.

14. The system of claim 12 wherein said power management is for a plurality of said virtual machine platforms, each platform respectively providing a plurality of virtual machines and said performed program includes:
- connecting a plurality of sets, each set including a plurality of client devices, respectively to the virtual machines in one of said plurality of virtual machine platforms;
- wherein a respective one of said virtual machine platforms is switched into a reduced power consumption state when all of said client devices connected to virtual machines in said respective one platform are in a non-active state.

15. The system of claim 11 wherein in the performance of said method:
said switching of said virtual machine platform into said reduced power state is controlled in said virtual machine platform.

* * * * *